United States Patent [19]

Wetzel et al.

[11] 4,169,393
[45] Oct. 2, 1979

[54] ENDLESS POWER TRANSMISSION BELT, METHOD OF MAKING SAME, AND DRIVE SYSTEM USING SAME

[75] Inventors: Robert E. Wetzel, Springfield; Joseph P. Miranti, Jr., Nixa; Donald D. Hall, Springfield, all of Mo.

[73] Assignee: Dayco Corporation, Dayton, Ohio

[21] Appl. No.: 871,669

[22] Filed: Jan. 23, 1978

Related U.S. Application Data

[63] Continuation-in-part of Ser. No. 824,580, Aug. 15, 1977, abandoned.

[51] Int. Cl.² .............................................. F16G 5/22
[52] U.S. Cl. .................................... 74/233; 74/234; 156/139; 87/7; 139/DIG. 1
[58] Field of Search ................ 74/231 R, 231 C, 237, 74/232, 233, 234, 231 CB; 156/137, 138, 139, 140, 141, 142; 428/294, 295; 264/46.9; 87/5, 7; 139/383 R, 419, DIG. 1

[56] References Cited

U.S. PATENT DOCUMENTS

| Re. 28,155 | 9/1974 | Dow | 139/DIG. 1 |
|---|---|---|---|
| 1,201,257 | 10/1916 | Cobb | 139/DIG. 1 |
| 1,341,987 | 6/1920 | Kline | 87/7 |
| 1,560,700 | 11/1925 | Langer | 139/383 R |
| 1,692,651 | 11/1928 | Greenspan | 87/7 |
| 2,244,835 | 6/1941 | Goldstein | 139/DIG. 1 |
| 2,281,148 | 4/1942 | Freedlander | 74/233 |
| 2,893,442 | 7/1959 | Genin | 74/231 R |
| 3,446,251 | 5/1969 | Dow | 139/DIG. 1 |
| 3,874,422 | 4/1975 | Dow | 139/383 R |
| 3,924,482 | 12/1975 | Meadows | 74/234 |
| 3,981,206 | 9/1976 | Miranti, Jr. et al. | 74/237 |
| 4,020,209 | 4/1977 | Yuan | 139/383 R |
| 4,027,545 | 6/1977 | White, Jr. | 74/233 |

FOREIGN PATENT DOCUMENTS 462042 4/1943 Canada ........................................ 74/234

*Primary Examiner*—Samuel Scott
*Assistant Examiner*—William R. Henderson
*Attorney, Agent, or Firm*—Reuben Wolk

[57] ABSTRACT

An endless power transmission belt, method of making same, and drive system using same are provided wherein such belt has a portion which has a plurality of spaced belt elements defined by alternating projections and recesses and a triaxial fabric bonded against the elements which defines an abrasion-resistant exposed surface of the elements with the triaxial fabric also minimizing shearing stresses in each element due to the isotropic character of such fabric which provides improved load distribution therethrough as well as improved tear resistance thereof. The belt may have elements in the form of load-transmitting teeth with the triaxial fabric having three sets of yarn courses in which one of the three sets is substantially protected by the two other yarn sets and the one yarn set provides reinforcement of the teeth after substantial wear of the two other yarn sets resulting in an increased service life for the belt.

41 Claims, 10 Drawing Figures

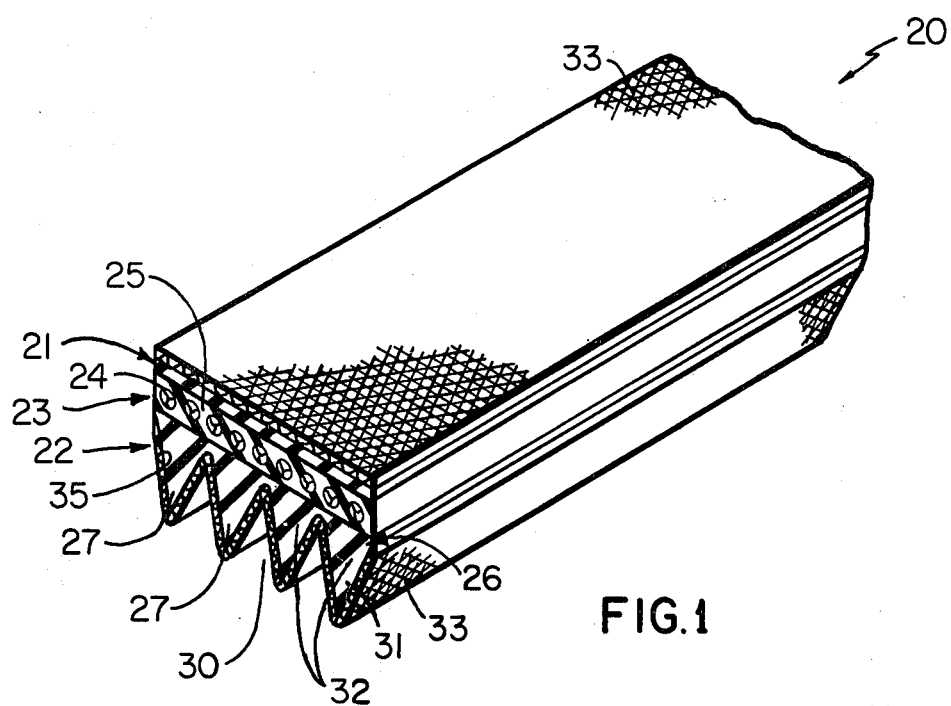
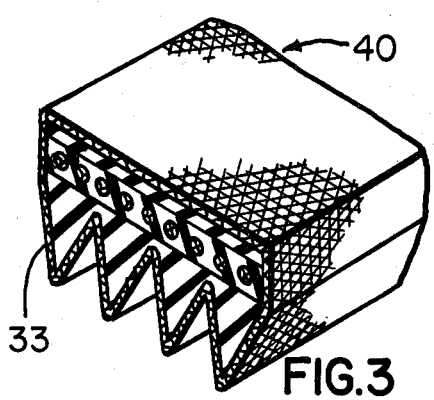
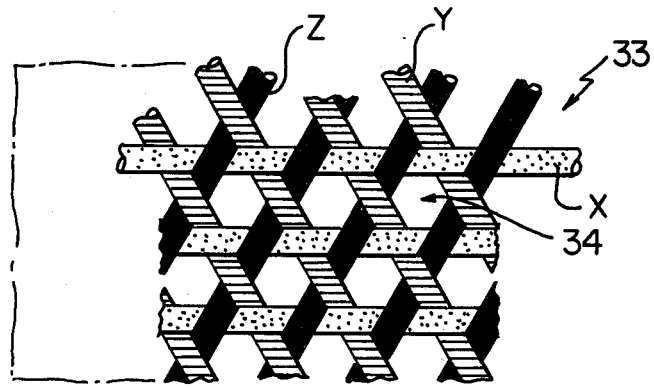
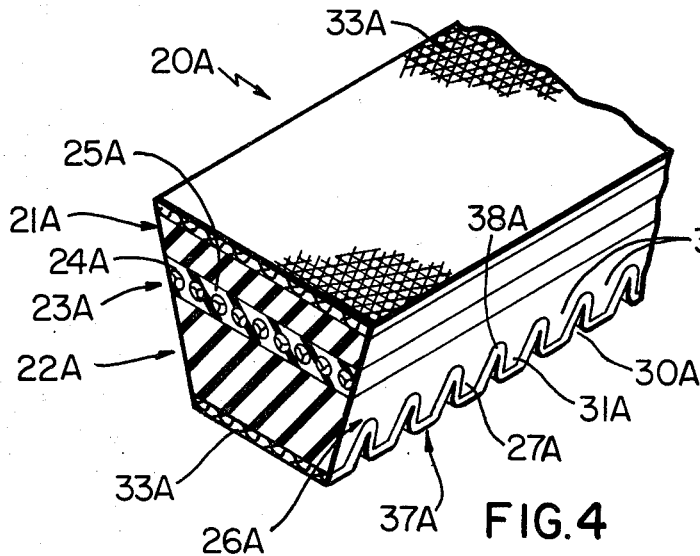
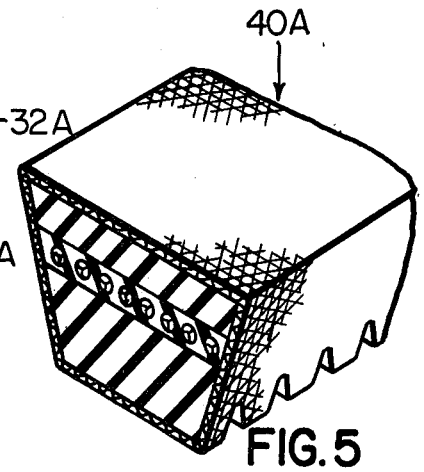

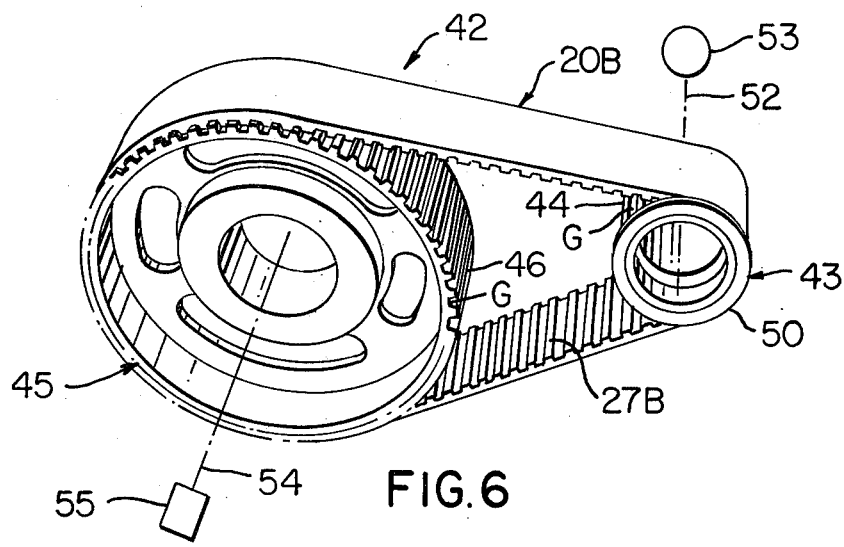
FIG.6
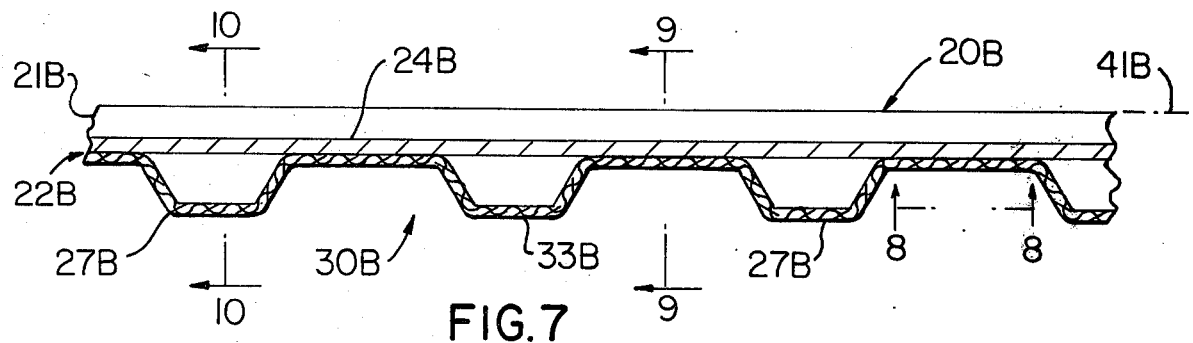
FIG.7
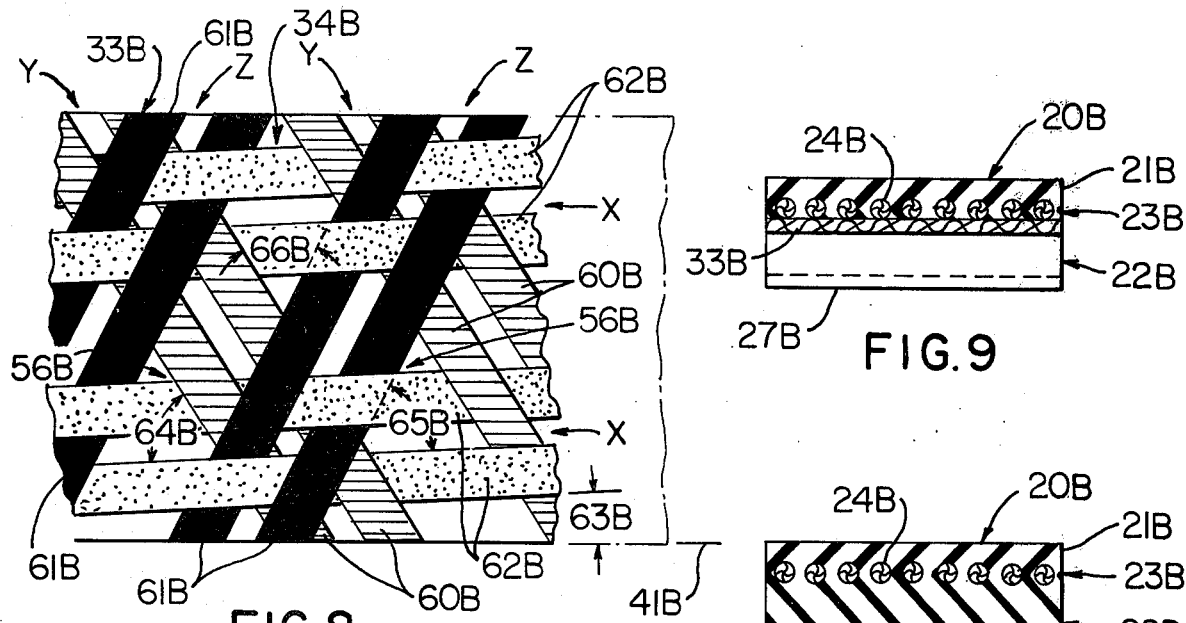
FIG.8
FIG.9
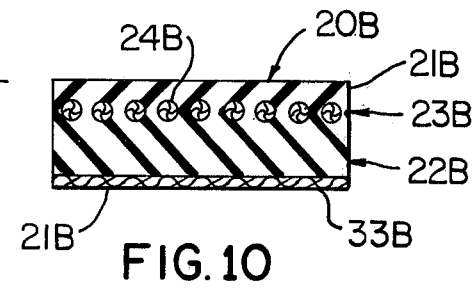
FIG.10

ENDLESS POWER TRANSMISSION BELT, METHOD OF MAKING SAME, AND DRIVE SYSTEM USING SAME

CROSS-REFERENCE TO RELATED APPLICATION

This application is a continuation-in-part of application Ser. No. 824,580 filed Aug. 15, 1977, now abandoned.

BACKGROUND OF THE INVENTION

Endless power transmission belts having outer portions provided with elements in the form of ribs, teeth, and the like have been proposed heretofore and it is known to cover these belt elements with fabric. However, when belts using fabric covered belt elements are operated in associated sheaves considerable stresses are imposed on the fabric causing buckling, premature wear, and often failure thereof usually followed by premature failure of the associated belt. In an effort to solve the above-mentioned failure problem, knitted fabrics have been proposed for this purpose and an example of such a fabric is disclosed in U.S. Pat. No. 3,981,206.

It is also well known in the endless power transmission belt art that in an endless power transmission belt which has a compression section provided with load-transmitting teeth there is substantial wear of such teeth; and, numerous attempts have been made heretofore to provide strong teeth which are subject to minimum wear.

However, none of the previously proposed belts employs a triaxial fabric which is abrasion-resistant, wear-resistant, and has improved tear resistance.

SUMMARY

It is a feature of this invention to provide a simple and economical endless power transmission belt having outer surfaces thereof covered by a triaxial fabric.

Another feature of this invention is to provide an endless power transmission belt comprising a portion having a plurality of spaced belt elements defined by alternating projections and recesses with each of the elements having an outer part and a root, a triaxial fabric being bonded against the elements to define an abrasion-resistant exposed surface of the elements and minimizing shearing stresses in each element due to the isotropic character of such fabric which provides improved load distribution therethrough as well as improved tear resistance thereof.

Another feature of the invention is to provide for bonding the fabric against the outermost surface of the tension section or around the entire outer surface of the belt.

Another feature of this invention is to provide a belt of the character mentioned wherein each element is in the form of a continuous longitudinal rib extending in an endless path along the belt.

Another feature of this invention is to provide a belt of the character mentioned wherein each belt element is in the form of a tooth disposed transverse the longitudinal axis of the belt.

Another feature of this invention is to provide an endless power transmission belt having a compression section provided with load-transmitting teeth defined by alternating projections and recesses and a fabric bonded against and defining the outer portions of the teeth with the fabric comprising a triaxial fabric having a plurality of three sets of yarn courses in which one of the three sets is substantially protected by the two other yarn sets and with the one yarn set providing reinforcement of the teeth after substantial wear of the two other yarn sets resulting in an increased service life for the belt.

Another feature of this invention is to provide an improved belt drive system comprising a plurality of toothed sheaves and a cooperating toothed endless power transmission belt operatively connected between the sheaves with the toothed belt having a compression section provided with load-transmitting teeth of the character mentioned.

Another feature of this invention is to provide a method of making an endless power transmission belt of the character mentioned.

Another feature of this invention is to provide an improved method of making an endless power transmission belt having a polymeric compression section provided with load-transmitting teeth of the character mentioned.

Therefore, it is an object of this invention to provide an endless power transmission belt, method of making same, and drive system using same having one or more of the novel features set forth above or hereinafter shown or described.

Other objects, features, details, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which FIG. 1 is a perspective view with parts in cross section, parts in elevation, and parts broken away illustrating one exemplary embodiment of the belt of this invention;

FIG. 2 is a fragmentary plan view of the triaxial fabric utilized on the belt of FIG. 1;

FIG. 3 is a view similar to FIG. 1 illustrating a modified form of the belt of FIG. 1;

FIG. 4 is a view similar to FIG. 1 illustrating another form of the invention;

FIG. 5 is a view similar to FIG. 3 illustrating a modified form of the belt of FIG. 3;

FIG. 6 is a perspective view illustrating a drive system employing another exemplary embodiment of an endless power transmission belt of this invention;

FIG. 7 is an enlarged side view of a straight top portion of the belt as illustrated in FIG. 6 showing by symbolic representation a triaxial fabric bonded against and defining the outer portions of the load-transmitting teeth and by standard cross hatching showing a helically wound load-carrying cord thereof to highlight the location of such cord;

FIG. 8 is a view taken essentially on the line 8—8 of FIG. 7 and illustrating only the three sets of yarn courses of the triaxial fabric minus adjoining structure while also showing the side edges of the belt and the longitudinal axis of such belt;

FIG. 9 is a cross-sectional view taken essentially on the line 9—9 of FIG. 7; and FIG. 10 is a cross-sectional view taken essentially on the line 10—10 of FIG. 7.

DESCRIPTION OF ILLUSTRATED EMBODIMENTS

Reference is now made to FIG. 1 of the drawing which illustrates one exemplary embodiment of an endless power transmission belt of this invention which is designated generally by the reference numeral 20. The belt 20, which is known in the industry as a V-ribbed belt, comprises a tension section 21, a compression section 22, and a load-carrying section 23 bonded between the tension and compression sections 21 and 22 respectively. The load-carrying section 23 may comprise any suitable load-carrying means; however, in this example of the invention, the load-carrying section is in the form of a helically wound load-carrying cord 24 which is surrounded by a cushion material or cushion 25 of high resiliency in the form of a rubber. In the completed belt 20 the cushion 25 is shown in the form of a unitary mass surrounding the helically wound load-carrying cord 24.

The compression section 22 includes an innermost portion designated generally by the reference numeral 26. The portion 26 includes a plurality of belt elements each designated by the reference numeral 27, and the elements 27 are defined by alternating projections and recesses as indicated at 30, for example.

Each element 27 of the exemplary belt 20 is a continuous longitudinal element which extends about the entire endless belt path; and, each element 27 is of uniform solid cross-sectional configuration throughout its endless path. In addition, each element 27 has a substantially V-shaped cross-sectional configuration and is thus in the form of a V-shaped rib 27.

Each of the elements or ribs 27 has a tip 31 and a root 32 which is integral with adjoining parts of the compression section and during operation of the belt 20 in associated sheaves, or the like, substantial stresses are imposed on the tip 31 of each element often causing cracking and premature failure of the elements 27. During operation of the belt 20 the elements 27 are also subjected to substantial wear and abrasion.

The belt 20 employs what will be referred to as a triaxial fabric 33 which is bonded against the elements 27 and defines the exposed surface of such elements. The triaxial fabric 33 has improved tear resistance which minimizes the shearing stresses at the root of each element. In addition, because of special weave characteristics of certain types of triaxial fabric 33 such types may be abrasion or wear resistant and are preferably employed in the belt of this invention.

The fabric 33 is preferably of the type disclosed in detail in U.S. Pat. No. 3,446,251; and, which is incorporated herein by reference, an example of such fabric as disclosed in the above patent is illustrated in FIG. 2 of the drawings. The exemplary fabric 33 of FIG. 2 has a plurality of three sets of yarn courses, which for convenience are illustrated of equal yarn size, and the yarns of each set are disposed in parallel relation. The yarns of one set, depicted in solid black, will be referred to as the woof or "Z" yarns; the yarns of a second set, depicted by cross-hatching, will be referred to as the weft or "Y" yarns; and the yarns of the third set, depicted by stippling, will be referred to as the warp or "X" yarn.

Although other types of triaxial fabric may be employed, such as those illustrated in the above-mentioned patent and others known in the art, the exemplary fabric 33 of FIG. 2 has been illustrated because of its ease of presentation.

The triaxial fabric has open spaces or pores between its various yarns as indicated at 34, for example, and such open spaces are uniformly placed throughout the fabric and are such that they lend themselves to calendering, frictioning, and the like with optimum control to help control the characteristics of the overall fabric and the belt on which it is employed. The fabric 33 may be bonded to associated belt elements such as the belt elements 27 utilizing any suitable technique known in the art and may employ adhesive means at the interface of the fabric 33 and associated belt body and such adhesive means is designated by the reference numeral 35. It will be appreciated that the adhesive means may be of any suitable type employed in the art for this purpose and may be applied in accordance with any technique known in the art.

In addition to covering the ribs or elements 27, the triaxial fabric 33 may be provided on or define a smooth nonundulating surface of a belt. For example, triaxial fabric 33 may also be employed and bonded to the outermost surface of the tension section 21 of the belt so that the finished belt 20 has triaxial fabric defining both its inside and outside surfaces.

The belt 40 which is shown in FIG. 3 is almost identical in construction to the belt 20. However, in this instance the fabric 33 is bonded to the entire outer surface of the belt 40. This lends itself to certain manufacturing processes that may be utilized as an alternative method.

Another exemplary embodiment of the belt structure or belt of this invention is illustrated in FIG. 4 of the drawings. The belt illustrated in FIG. 4 is different than the belt 20 and is designated by the reference numeral 20A. The belt 20A has a tension section 21A, a compression section 22A, and a load-carrying section 23A comprised of a helically wound load-carrying cord 24A embedded in a polymeric matrix or cushion 25A. The belt 20A has a triaxial fabric top cover 33A defining its outside surface, and cover 33A is similar to the top cover 33 employed on the belt 20 of FIG. 1.

The belt 20A is referred to as a toothed or cogged V-belt. The principal difference between the belt 20A and the belt 20 is that the belt 20A instead of having elements in the form of longitudinally extending V-shaped ribs, has transversely extending elements which will be referred to as teeth and designated by reference numeral 27A. The elements axis of the belt 20A and preferably extend perpendicular to such longitudinal axis. In a similar manner as previously described for the elements or V-shaped ribs 27 the teeth 27A are defined by alternating projections and recesses as shown at 30A.

The teeth 27A form the outer portion 26A of the compression section 22A and each tooth 27A extends completely across the belt 20A. Each tooth 27A has an outer tip 31A and a root 32A, adjacent teeth being separated by grooves 30A. The triaxial fabric 33A is bonded in position against the teeth 27A so that the fabric assures shearing stresses and hence cracks at the root of each element 27A are kept at a minimum. Accordingly, the belt 20A of this example also has triaxial fabric 33A defining both its inside and outside surfaces.

Each tooth 27A illustrated in the exemplary belt 20A has an outer portion which is free of sharp edges but has a substantially rectangular outline as shown at 37A. However, it should be understood that the outer portion may be more rounded and essentially semi-circular. In addition, the inner surface 38A of the grooves may also be more rounded.

The belt 40A, which is illustrated in FIG. 5, is identical in internal construction to the belt 20A. However, in this instance the fabric 33 is bonded to the entire outer surface of belt 40A, in order to permit fabrication of the belt by other processes.

The compression section of each belt 20, 20A, 40 and 40A is comprised of a plurality of spaced belt elements extending outwardly from the belt body, and defined by alternating projections and recesses. In the belts 20 and 40 such elements are in the form of longitudinal ribs 27 while in the belts 20A and 40A such elements are in the form of transverse teeth 27A. However, it will be appreciated that, if desired, either ribs or teeth may be provided and defined as an integral part of a tension section of an associated belt in a similar manner; also, a double V-ribbed belt, double cogged belt, or a V-ribbed cogged belt may be formed.

Except for the load-carrying cord and the triaxial fabric thereof, the belts have been shown by cross-hatching in the drawings as being made of polymeric material in the form of rubber. However, it will be appreciated that instead of rubber each of such belts may be made of any suitable synthetic plastic material known in the art.

Another exemplary embodiment of an endless power transmission belt structure or belt of this invention is illustrated in FIGS. 6-10 of the drawings and such belt is designated generally by the reference numeral 20B. The belt 20B is often popularly referred to as a synchronous-type belt because it has belt elements or teeth 27B which are in the form of load-transmitting teeth which cooperate with toothed sheaves as will be described in more detail hereinafter. The teeth 27B are disposed perpendicular to the longitudinal axis 41B of the belt 20B.

The exemplary belt 20B is particularly adapted to be used in a drive system 42, as shown in FIG. 6, and such drive system may include a plurality of toothed sheaves including a toothed driving sheave 43 having teeth 44 therein and a toothed driven sheave 45 having teeth 46 therein with the transverse teeth 27B of the belt 20B meshing within grooves G provided between the teeth 44 and 46 of the sheaves 43 and 45 respectively and as is known in the art. The toothed sheave 43 has a pair of side flanges 50 on opposite sides thereof and the flanges 50 prevent the belt 20B from sliding off the sheaves 43 and 45 during operation of the system 42. The driving sheave 43 may be suitably operatively connected by a shaft 52 to a drive motor 53 while the sheave 45 may be suitably operatively connected by a shaft 54 to a suitable load 55 which is to be rotated. The shafts 52 and 54 as well as motor 53 and load 55 are shown by schematic representations. With this construction and arrangement the toothed belt 20B is employed to rotate toothed sheave 45 in a synchronous manner with rotation of toothed sheave 43 employing the teeth 27B of belt 20B.

The belt 20B comprises a tension section 21B, a compression section 22B, and a load-carrying section 23B in the form of a helically wound load-carrying cord 24B. The cord 24B may be surrounded by a suitable cushion material in a similar manner as disclosed earlier in connection with other embodiments of the belt of this invention and the load-carrying cord 24B may be of any suitable type employed in the art for this purpose.

The load-transmitting teeth 27B comprising the compression section 22B of the belt 20B are preferably made of a suitable polymeric material shown in the drawings by cross-hatching as rubber and triaxial fabric 33B bonded against and defining the outer portions of such teeth 27B. The load-transmitting teeth 27B are defined by alternating projections and recesses as indicated at 30B, for example, and triaxial fabric 33B upon being bonded in position also defines the exposed outer surfaces of the teeth.

Referring now to FIG. 8 of the drawings, it is seen that the triaxial fabric 33B is comprised of a plurality of three sets of yarn courses which as in previous embodiments and for convenience are illustrated of equal yarn size and the yarns of each set are disposed in parallel relation. In a similar manner as described in connection with FIG. 2, the yarns of one set, depicted as solid black, will be referred to as the woof or "Z" yarns; the yarns of a second set, depicted by cross-hatching, will be referred to as the weft or "Y" yarns; and the yarns of the third set, depicted by stippling, will be referred to as the warp or "X" yarns. From the illustration of FIG. 8 it is seen that one (the set of Y yarns) of the three sets of parallel yarns is substantially protected by the other two yarn sets. Stated otherwise, the set of Y yarns is substantially protected by X and Z yarns as shown at a pair of typical locations 56B, for example. With this construction the set of Y yarns provides reinforcement for the teeth 27B after substantial wear of the other two sets (the Z and X sets) which results in an increased service life for the belt 20B.

The triaxial fabric 33B has each of its three sets of yarn courses comprised of parallel yarns; and, each yarn of each set is defined by a plurality of side-by-side yarn strands. For example, each of the Y yarns is defined by a pair of side-by-side yarn strands 60B, each of the Z yarns is defined by a pair of side-by-side yarn strands 61B, and each of the X yarns is defined by a pair of side-by-side yarn strands 62B.

In the belt 20B the triaxial fabric 33B is provided so that the parallel X yarns are each disposed approximately parallel to the longitudinal axis 41B of such belt; and, in this example each of the X yarns is disposed at a slight angle to such longitudinal axis 41B and as shown at 63B. The parallel Y yarns are each disposed at an acute included angle 64B measured clockwise relative to the X yarns. The parallel Z yarns are each disposed at an acute included angle 65B measured counterclockwise relative to the X yarns.

The Y and Z yarns are preferably disposed with an included angle 66B of approximately 60° therebetween. However, the Y yarns may be disposed so that the included angle 64B may range between 30° and 75° and the Z yarns may be disposed so that the included angle 65B may range between 30° and 75°.

The Y yarns of fabric 33B may be made of any suitable high strength material used in the weaving art. For example, the Y yarns may be made of a high strength synthetic plastic material, whereby such Y yarns provide the belt 20B with improved structural strength. It will also be appreciated that one set of the comparatively more exposed X and Z yarns (Z yarns in this example) may be made of self-lubricating yarn fibers or filaments whereby the load-transmitting teeth 27B are self-lubricated. Any suitable material may be used to provide the self-lubricating action whereby the yarns may be made of carbonaceous materials, polypropylene, or a suitable fluorocarbon resin. For example, a yarn made of a fluorocarbon resin and sold under the registered trademark of "Teflon" by the Fluorocarbons Division of E. I. duPont de Nemours and Co., Inc., Wilmington, Del., 19898 may be used in making triaxial fabric 33B.

In addition to the constructions previously described, the triaxial fabric used to make one or more portions of various belts of this invention may be made of yarns comprised of any suitable material such as filaments or fibers of cotton, or the like. Similarly, such fabric may be made of synthetic plastic filaments or fibers or blends of natural and synthetic plastic filaments or fibers.

Each belt disclosed herein may be made in accordance with any suitable manufacturing process known in the art. Further, the bonding of the triaxial fabric preferably comprises coating such fabric with a layer of polymeric material compatible with the polymeric material of the particular section against which the triaxial fabric is bonded. For example, for the toothed belt 20B having load-transmitting or load-carrying teeth 27B the triaxial fabric 33B is preferably coated with a polymeric material (rubber) which is compatible with the polymeric material (also rubber) of the compression section 22B whereupon the entire belt is then cured to thereby cure the coated layer of polymeric material, the compression section, and the overall belt 20B. This technique provides a simultaneous bonding and curing action. After curing, each belt is suitably cooled in accordance with any suitable technique known in the art.

The triaxial fabric employed to make each exemplary belt of this invention has open spaces or pores uniformly and symmetrically disposed throughout and such spaces and fabric enable the fabric to be calendered, frictioned, skim coated, knife coated, and the like. Accordingly, fabric 33 has spaces as indicated at 34 in FIG. 2 and fabric 33B has spaces as indicated at 34B, for example, in FIG. 8.

The tension section and compression section of each belt disclosed herein may comprise one or more platform layers and each platform layer may be of any type known in the art. Further, each of such sections may be reinforced by any suitable means.

Reference has been made in this disclosure to the fact that the triaxial fabric is isotropic in character. This is achieved because in the manufacture of an associated belt the fabric is stretched so that any crimp is substantially removed from the various yarns whereby all of such yarns assume a substantially straight configuration. The construction, size, and angular disposal of the various sets of yarns of the triaxial fabric result in the load-elongation characteristics of such fabric being substantially equal regardless of the angle at which a load may be transmitted to the triaxial fabric, i.e., the fabric assumes its isotropic character.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt comprising, a portion having a plurality of spaced belt elements defined by alternating projections and recesses, each of said elements having an outer part and a root, and a triaxial fabric bonded against said elements and defining an abrasion-resistant exposed surface of said elements, said triaxial fabric also minimizing shearing stresses in each element due to improved tear resistance thereof, said triaxial fabric being defined by three angularly displaced sets of parallel courses of yarn interwoven to prevent slippage of at least one yarn course set along any other yarn course set.

2. A belt as set forth in claim 1 in which said triaxial fabric is disposed against said elements independently of any particular orientation of its yarn courses relative to the longitudinal axis of said belt.

3. A belt as set forth in claim 1 and further comprising a compression section, said spaced belt elements defining the outer portion of said compression section.

4. A belt as set forth in claim 3 and further comprising a load-carrying section adjoining said compression section at a location remote from said outer portion.

5. A belt as set forth in claim 4 in which each element extends longitudinally of the endless path of said belt.

6. A belt as set forth in claim 5 in which each element has a substantially V-shaped cross-sectional configuration and is in the form of a rib.

7. A belt as set forth in claim 4 and further comprising a tension section adjoining said load-carrying section, said fabric also bonded against the outermost surface of said tension section.

8. A belt as set forth in claim 7 in which said fabric is bonded against the entire outer surface of said belt.

9. A belt as set forth in claim 1 in which each element extends transverse the longitudinal axis of said belt.

10. A belt as set forth in claim 1 in which each element is in the form of a tooth which extends perpendicular to the longitudinal axis of said belt and extends completely across said belt.

11. An endless power transmission belt comprising, a tension section, a compression section, a load-carrying section bonded between said tension and compression sections, said compression section having a plurality of spaced belt elements defined by alternating projections and recesses, each of said belt elements having an outer part and a root which is integral with adjoining parts of said compression section, and a triaxial fabric bonded against said elements and defining an abrasion-resistant inside surface of said belt, said triaxial fabric also minimizing shearing stresses in each element due to improved tear resistance thereof, said triaxial fabric being defined by three angularly displaced sets of parallel courses of yarn interwoven to prevent slippage of at least one yarn course set along any other yarn course set.

12. A belt as set forth in claim 11 in which said triaxial fabric is disposed against said elements independently of any particular orientation of its individual yarn courses relative to the longitudinal axis of said belt.

13. A belt as set forth in claim 12 in which each element extends in an endless path.

14. A belt as set forth in claim 13 in which each element has a substantially V-shaped cross-sectional configuration and is in the form of a rib.

15. A belt as set forth in claim 13 in which each element extends transverse the longitudinal axis of said belt.

16. A belt as set forth in claim 15 in which each element is in the form of a tooth.

17. A belt as set forth in claim 11 in which said fabric is also bonded against the outermost surface of said tension section.

18. A belt as set forth in claim 11 in which said fabric is bonded against the entire outer surface of said belt.

19. In an endless power transmission belt having a compression section provided with load-transmitting teeth defined by alternating projections and recesses and a fabric bonded against and defining the outer portions of said teeth, the improvement wherein said fabric comprises a triaxial fabric having a plurality of three sets of yarn courses in which one of said three sets is substantially protected by the two other yarn sets, said one yarn set providing reinforcement of said teeth after substantial wear of said two other yarn sets resulting in an increased service life for said belt.

20. In a belt as set forth in claim 19 the further improvement wherein each of said sets of yarn courses is comprised of a plurality of spaced parallel yarns and each yarn of each set is defined by a plurality of side-by-side yarn strands.

21. In a belt as set forth in claim 20 the further improvement wherein each of said spaced parallel yarns of each set is defined by two side-by-side yarn strands.

22. In a belt as set forth in claim 20 the further improvement wherein said three sets of yarn courses are defined by a set of parallel X yarns disposed approximately parallel to the longitudinal axis of said belt, a set of parallel Y yarns each disposed at an acute included angle measured clockwise relative to said X yarns, and a set of parallel Z yarns each disposed at an acute included angle measured counterclockwise relative to said X yarns.

23. In a belt as set forth in claim 22 the further improvement wherein said Y yarns define said one yarn set, said Y yarns being made of a synthetic plastic material and having improved structural strength.

24. In a belt as set forth in claim 22 the further improvement wherein at least one set of said Y and Z yarns is made of self-lubricating yarn filaments providing a self-lubricating action of said load-transmitting teeth.

25. In a belt as set forth in claim 24 the further improvement wherein said Y and Z yarns are disposed with an included angle of approximately 60° therebetween.

26. In a belt as set forth in claim 22 the further improvement wherein said Y yarns are disposed at said acute included angle with said X yarns ranging between 30° and 75°, and said Z yarns are disposed at said acute included angle with said X yarns ranging between 30° and 75°.

27. In a belt as set forth in claim 22 the further improvement wherein said belt has a tension and a load-carrying section, said load-carrying section being made of a helically wound load-carrying cord.

28. In a belt as set forth in claim 26 the further improvement wherein said tension section is free of an outer cover.

29. A belt drive system comprising a plurality of toothed sheaves including a driving sheave and a driven sheave and a toothed endless power transmission belt operatively connected between said sheaves, said belt having a compression section provided with load transmitting teeth defined by alternating projections and recesses and a fabric bonded against and defining the outer portions of said teeth, said fabric comprising a triaxial fabric having a plurality of three sets of yarn courses in which one of said three sets is substantially protected by the two other yarn sets, said one yarn set providing reinforcement of said teeth after substantial wear of said two other sets resulting in an increased service life for said belt.

30. A belt drive system as set forth in claim 29 in which each of said sets of yarn courses is comprised of a plurality of spaced parallel yarns and each yarn of each set is defined by a plurality of side-by-side yarn strands.

31. A belt drive system as set forth in claim 30 in which each of said spaced parallel yarns of each set is defined by two side-by-side yarn strands.

32. A belt drive system as set forth in claim 30 in which said three sets of yarn courses are defined by a set of parallel X yarns disposed approximately parallel to the longitudinal axis of said belt, a set of parallel Y yarns each disposed at an acute included angle measured clockwise relative to said X yarns, and a set of parallel Z yarns each disposed at an acute included angle measured counterclockwise relative to said X yarns.

33. In a method of making an endless power transmission belt having a tension section, a compression section, and a load-carrying section bonded between said tension and compression sections with said compression section having a plurality of spaced belt elements defined by alternating projections and recesses, the improvement comprising the steps of, providing a triaxial fabric in the form of a pliable fabric, said triaxial fabric being defined by three angularly displaced sets of parallel courses of yarn interwoven to prevent slippage of at least one yarn course set along any other yarn course set, and bonding said triaxial fabric against said elements to define an abrasion-resistant inside surface for said belt, said triaxial fabric also minimizing shearing stresses in each element due to improved tear resistance thereof.

34. In a method as set forth in claim 33 the further improvement in which said bonding step comprises disposing said fabric against said elements independently of any particular orientation of its individual yarn courses relative to the longitudinal axis of said belt.

35. In a method as set forth in claim 33 the further improvement comprising the step of bonding said triaxial fabric against the outermost surface of said tension section.

36. In a method as set forth in claim 33 the further improvement comprising the step of bonding such triaxial fabric against the entire outer surface of said belt.

37. In a method of making an endless power transmission belt having a polymeric compression section provided with load-transmitting teeth defined by alternating projections and recesses, the improvement comprising the steps of, providing a triaxial fabric defined by a plurality of three sets of yarn courses in which one of said three sets is substantially protected by the two other yarn sets, and bonding said triaxial fabric against said teeth to define the outer portion thereof, said bonding step comprising disposing said yarn so that said one yarn set is protected by the two other yarn sets and provides reinforcement of said teeth after substantial wear of said two other sets resulting in an increased service life for said belt.

38. In a method as set forth in claim 37 the further improvement in which said providing step comprises providing said triaxial fabric with each of said sets of yarn courses comprised of a plurality of spaced parallel yarns and with each yarn of each set being defined by a plurality of side-by-side yarn strands.

39. In a method as set forth in claim 38 the further improvement in which said bonding step comprises coating said triaxial fabric with a layer of polymeric material compatible with the polymeric material of said compression section and curing said layer, compression section, and belt to provide a simultaneous bonding and curing action.

40. In a method as set forth in claim 38 the further improvement in which said providing step comprises providing said three sets of yarn courses defined by a set of parallel X yarns disposed approximately parallel to the longitudinal axis of said belt, a set of parallel Y yarns each disposed at an acute included angle measured clockwise relative to said X yarns, and a set of parallel Z yarns each disposed at an acute included angle measured counterclockwise relative to said X yarns.

41. In a method as set forth in claim 40 the further improvement in which said providing step comprises providing at least one set of said Y and Z yarns made of self-lubricating yarn filaments said filaments providing a self-lubricating action of said load-transmitting teeth.

* * * * *